(12) United States Patent
Esteghlal et al.

(10) Patent No.: US 11,909,319 B2
(45) Date of Patent: Feb. 20, 2024

(54) METHOD FOR OPERATING VOLTAGE CONVERTERS CONNECTED IN PARALLEL

(71) Applicant: Robert Bosch GmbH, Stuttgart (DE)

(72) Inventors: Gholamabas Esteghlal, Stuttgart-Weilimdorf (DE); Markus Klein, Winnenden (DE)

(73) Assignee: Robert Bosch GmbH, Stuttgart (DE)

( * ) Notice: Subject to any disclaimer, the term of this patent is extended or adjusted under 35 U.S.C. 154(b) by 11 days.

(21) Appl. No.: 17/637,670

(22) PCT Filed: Aug. 10, 2020

(86) PCT No.: PCT/EP2020/072385
§ 371 (c)(1),
(2) Date: Feb. 23, 2022

(87) PCT Pub. No.: WO2021/037543
PCT Pub. Date: Mar. 4, 2021

(65) Prior Publication Data
US 2022/0278619 A1  Sep. 1, 2022

(30) Foreign Application Priority Data
Aug. 30, 2019 (DE) ............. 10 2019 213 073.9

(51) Int. Cl.
*H02M 3/158* (2006.01)
*H02M 7/493* (2007.01)

(52) U.S. Cl.
CPC ......... *H02M 3/1584* (2013.01); *H02M 7/493* (2013.01)

(58) Field of Classification Search
CPC ... H02M 3/1584; H02M 3/1586; H02M 7/493
See application file for complete search history.

(56) References Cited

U.S. PATENT DOCUMENTS

| | | | |
|---|---|---|---|
| 5,493,154 A | 2/1996 | Smith et al. | |
| 10,284,095 B1* | 5/2019 | Mednik | H02M 3/1584 |
| 2017/0248996 A1* | 8/2017 | Zhang | H02M 3/1584 |
| 2019/0103806 A1* | 4/2019 | Miyake | H02M 3/1584 |
| 2019/0214913 A1* | 7/2019 | Murakami | H02P 29/68 |
| 2020/0373826 A1* | 11/2020 | Suzuki | H02M 1/327 |
| 2021/0408912 A1* | 12/2021 | Sun | H02M 3/157 |

FOREIGN PATENT DOCUMENTS

| | | |
|---|---|---|
| DE | 102016219740 A1 | 4/2018 |
| EP | 3462587 A1 | 4/2019 |

OTHER PUBLICATIONS

Translation of International Search Report for Application No. PCT/EP2020/072385 dated Oct. 2, 2020 (2 pages).

* cited by examiner

*Primary Examiner* — Alex Torres-Rivera
(74) *Attorney, Agent, or Firm* — Michael Best & Friedrich LLP

(57) ABSTRACT

The present invention relates to methods (100) and to a device (200) for operating voltage transformers (210, 220) connected in parallel, wherein the voltage transformers (210, 220) are operated in different operating modes (120, 130) as a function of a determined temperature (Tist) in order to avoid overheating of an individual voltage transformer.

2 Claims, 2 Drawing Sheets

METHOD FOR OPERATING VOLTAGE CONVERTERS CONNECTED IN PARALLEL

BACKGROUND OF THE INVENTION

The present invention relates to a method for operating voltage converters connected in parallel for at least one first and one second voltage converter connected in parallel on the output side and a device for operating voltage converters connected in parallel for at least one first and one second voltage converter connected in parallel on the output side.

Document DE 10 2016 219 740 A1 discloses a DC-DC converter having a plurality of DC-DC converter modules connected in parallel. In this case, a common voltage regulator is provided for all of the DC-DC converter modules. Furthermore, separate current regulation is provided for each DC-DC converter module.

Voltage converters are intended for converting an input voltage into an output voltage, wherein the voltage level of the input voltage can be different than the voltage level of the output voltage. The maximum output power of a voltage converter is limited corresponding to the dimensions of the components used. In order to increase the output power, a plurality of voltage converter modules can be connected in parallel, if appropriate. Depending on the dimensions of the components used, a voltage converter has an operating point at which its efficiency is optimal. An operating point of a voltage converter can be described and can vary by means of one or more parameters, for example by means of the parameters output current, input current, output voltage, input voltage, temperature. Usually, on the basis of the task set, or on the basis of the component parts connected to the voltage converter, some parameters are preset, with the result that the operating point cannot be freely selected during operation of the voltage converter. This means that voltage converters can also be operated at operating points which have poor efficiency. This can result in severe heating of the component parts of the voltage converter. Therefore, there is a need for methods which prevent excessive heating of individual voltage converters of voltage converters connected in parallel.

SUMMARY OF THE INVENTION

The present invention discloses a method for operating voltage converters connected in parallel for at least one first and one second voltage converter connected in parallel on the output side and a device for operating voltage converters connected in parallel for at least one first and one second voltage converter connected in parallel on the output side. Further advantageous embodiments are the subject matter of the dependent patent claims.

Accordingly, the following is provided:

A method for operating voltage converters connected in parallel for at least one first and one second voltage converter connected in parallel on the output side, comprising the following steps: operating the voltage converters connected in parallel in different operating modes depending on a determined temperature and a presettable first temperature limit value (Tth) and/or depending on a determined current and a first presettable current limit value; operating the voltage converters in a first operating mode when the determined temperature is less than the presettable first temperature limit value; operating the voltage converters in a second operating mode when the determined temperature is greater than the presettable first temperature limit value and/or the determined current is less than the first presettable current limit value. In this case, the operation of the voltage converters in the first operating mode comprises the operation of, in particular only, a first one of the at least two voltage converters and a switched-off state of a second of the at least two voltage converters. And in this case, the operation of the voltage converters in the second operating mode comprises two, in particular successive, operating phases. A first operating phase comprises the common parallel operation of the at least two voltage converters, and a second operating phase comprises the operation of a selected one of the at least two voltage converters and a switched-off state of at least one of the two voltage converters.

In the case of voltage converters connected in parallel on the output side, the output terminals of the voltage converters connected in parallel are connected in parallel. This means that the first output terminal of a first voltage converter is electrically connected to the first output terminal of a further voltage converter, and that a second output terminal, or the ground terminal, of the first voltage converter is electrically connected to the second output terminal, or the ground terminal, of the further voltage converter. An operating mode is a specially characterized operating method for one or more voltage converters. Depending on a determined temperature and/or a current, an operating mode is selected from various available operating modes for the operation of a voltage converter. For this purpose, the temperature is determined, in particular continuously, by means of a sensor device or a temperature model. The sensor device or the temperature model is designed to determine the temperature of a cooling circuit, which is in particular thermally coupled to the voltage converters, the temperature of the voltage converters, of a component, in particular of a switching element of a voltage converter. The temperature model in this case calculates the temperature from physical data of the system, for example current, voltage through the voltage converter and/or the duration of operation of the voltage converter. The determined current, in particular a preset current, for example an output current, is determined for this purpose, in particular continuously, by means of a sensor device or via variables which have been determined or modelled and correlate to the current. The sensor device or the computation model is designed to determine the output current or input current or current through the voltage converter. The current in the system changes or is preset depending on the consumers to be supplied which are connected to the voltage converters connected in parallel at the common output. The temperature model in this case calculates the temperature from physical data of the system, for example current, voltage through the voltage converter and/or the duration of operation of the voltage converter. A presettable temperature limit value is a parameter which is preset for the method depending on the components used and the specification thereof. It is selected in such a way that, during operation of the method and consideration of the temperature limit value, permanent operation of the voltage converters and of the components contained therein is made possible. A presettable current limit value is a parameter which is preset for the method depending on the components used and the specification thereof. It is selected in such a way that, during operation of the method and consideration of the current limit value, permanent operation of the voltage converters and the components contained therein is made possible. The first operating mode is characterized by the fact that a first of the voltage converters connected in parallel is operated and a second is switched off or not operated. If a voltage converter is being operated, it outputs an electrical power across its output terminals. There is an electrical voltage present at the output terminals and an electrical current flows. For this purpose, a switching element located in the voltage converter is operated in clocked fashion. A switched-off state of a voltage converter or a switched-off or non-operated voltage converter does not output an electrical power at its output terminals. No current flows. The wording "a switched-off state" in this disclosure is intended to be understood to be synonymous with "not operated" or "a deactivated state" and not as a transition from "operation" to "non-operation". The second operating mode is characterized by the fact that it comprises two, in particular successive, operating phases. In a first operating phase, the voltage converters connected in parallel are operated parallel, i.e. a plurality of voltage converters each produce part of the current to be made available at the output. In a second operating phase, a selected, in particular only one selected, voltage converter is operated and one of the voltage converters is switched off or not operated.

A method is provided which, depending on the temperature and/or the determined current, varies the operating modes for the operation of voltage converters connected in parallel. Precisely at low currents, the efficiency of a voltage converter is unfavorable, which results in severe levels of waste heat and therefore heating of the components of the voltage converter.

Advantageously, a method is provided which provides for parallel operation of the voltage converters prior to overheating of a voltage converter or the components thereof. Advantageously, in this case the temperature of the warmer voltage converter is reduced. In this case, owing to the interposed parallel operation of at least two voltage converters, there are no current fluctuations on the output side of the voltage converters connected in parallel.

In another configuration of the invention, the operation of the selected of the at least two voltage converters comprises the operation of that voltage converter which was switched off in a first operating mode which has most recently taken place when, directly previously, a transition from the first operating mode to the second operating mode took place. Or the operation of the selected of the at least two voltage converters comprises the operation of that voltage converter which was switched off in a second operating mode which has most recently taken place in the second operating phase when, directly previously, already operation in the second operating mode took place.

Accordingly, a voltage converter for operation in the second operating phase is selected which was switched off or not operated in the method directly prior to the parallel operation which has most recently taken place.

Advantageously, a method is provided which enables alternate operation of voltage converters connected in parallel. Before the components of a voltage converter overheat owing to operation at an unfavorable operating point, for example in the case of a low setpoint current preset at the output of the voltage converters connected in parallel, a possibility is provided by means of the method of alternately operating individual voltage converters connected in parallel. Nonuniform loading of the individual voltage converters is avoided owing to the alternate operation.

In another configuration of the invention, the operating phases in the second operating mode are performed in particular continuously and/or with in each case presettable first and second operating durations.

The durations of the individual operating phases in the second operating mode are presettable. The sequence of the operating modes and operating phases is in particular continuous. This serves to avoid output current interruptions or output current fluctuations of the voltage converters connected in parallel.

Advantageously, the cooling phase of the non-operated voltage converter can be matched to the overall design of the voltage converters connected in parallel by means of the cooling device. Furthermore, the output current fluctuations of the voltage converters connected in parallel which occur in the case of a change of the operation from a first voltage converter to a second voltage converter can be reduced by means of presetting the duration of the parallel operation of the voltage converters.

In another configuration of the invention, the first operating duration of the first operating phase lasts for a shorter period of time than the second operating duration of the second operating phase. In particular, the first operating duration is shorter than one second, and the second operating duration is longer than one second.

Typical values for the first operating duration are a quarter of a second, half a second, three quarters of a second. Typical values for the second operating duration are one second, one and a half seconds and two seconds.

Advantageously, parameters are provided which enable permanent, continuous operation of voltage converters connected in parallel with reduced current fluctuations.

In another configuration of the invention, prior to the beginning of the second operating phase, the current of the at least one of the two voltage converters which is to be switched off is limited to zero ampere.

In the first operating phase, which comprises the common parallel operation of the at least two voltage converters, at the end of the first operating phase, the current of the at least one of the two voltage converters which is to be switched off is regulated to zero ampere by means of a current regulator. The second operating phase, which comprises a switched-off state or non-operation of at least one of the two voltage converters, can therefore be introduced directly. For the limitation of the current to zero ampere, the current controller is in particular preset special controller parameters (P, I, D) in order to enable soft limitation of the current.

Advantageously, output current fluctuations of the voltage converters connected in parallel are reduced.

In another configuration of the invention, the method comprises the following further steps: operating the voltage converters connected in parallel in different operating modes depending on a second presettable current limit value, wherein the second current limit value is greater than the first current limit value; operating the voltage converters in a third operating mode when the determined current is greater than the second current limit value; operating the voltage converters in the first or second operating mode when the determined current is less than the second current limit value.

Depending on a second presettable current limit value, an operating mode is selected from various available operating modes for the operation of a voltage converter. The current is determined as explained above. A second presettable current limit value is a parameter which is preset for the method depending on the components used and the specification thereof. It is selected in such a way that, during operation of the method and consideration of the current limit value, permanent operation of the voltage converters and the components contained therein is made possible.

Advantageously, an optimized method for operation of the voltage converters connected in parallel with as few losses as possible is provided.

In another configuration of the invention, the method comprises the following further steps: operating the voltage converters connected in parallel in different operating modes depending on the total efficiency of the voltage converters connected in parallel; operating the voltage converters in a third operating mode when the total efficiency in the third operating mode is greater than in the first operating mode; operating the voltage converters in the first or second operating mode when the total efficiency in the third operating mode is less than in the first operating mode.

The total efficiencies of the voltage converters connected in parallel for different operating points of the operation of all of the voltage converters connected in parallel or of a subset of the voltage converters connected in parallel or individual voltage converters can be determined by means of measurements at the voltage converters connected in parallel. These data are stored in a family of characteristics, for example. For as efficient operation as possible, the data can be read in depending on the preset of an operating point, and the corresponding total efficiency for the different operating modes can be read out. When the total efficiency for operation in a third mode is greater than in the first mode, the voltage converters connected in parallel are operated in the third mode. The third mode is in particular characterized by the fact that at least two voltage converters of the voltage converters connected in parallel are operated together. When the total efficiency for operation in the third mode is less than in the first mode, the voltage converters connected in parallel are operated in the first or second mode.

In particular in the case of relatively high preset setpoint output currents, the total efficiency during parallel operation of a plurality of the at least two voltage converters is higher.

Advantageously, an optimized method for operation of the voltage converters connected in parallel with as few losses as possible is provided.

In addition, the invention relates to a computer program, which is designed to implement the previously described method.

In addition, the invention relates to a machine-readable storage medium, on which the described computer program is stored.

In addition, the invention relates to a device for operating voltage converters connected in parallel for at least one first and one second voltage converter connected in parallel on the output side. The device comprises control logic, which is designed to operate the voltage converters connected in parallel in different operating modes depending on a determined temperature and a presettable first temperature limit value and/or depending on a determined current and a first presettable current limit value. In this case, the voltage converters are operated in a first operating mode when a determined temperature is less than the presettable first temperature limit value. The voltage converters are operated in a second operating mode when the determined temperature is greater than the presettable first temperature limit value and/or the determined current is less than the first presettable current limit value.

A device having control logic is provided which, depending on the temperature and the current, varies the operating modes for the operation of voltage converters connected in parallel.

Advantageously, a device having control logic is provided which, prior to overheating of a voltage converter or components thereof, controls parallel operation of the voltage converters. Advantageously, in this case the temperature of the warmer voltage converter is reduced. In this case, owing to the interposed parallel operation of at least two voltage converters, there are no output-side current fluctuations of the voltage converters connected in parallel.

In one configuration of the invention, the device comprises the voltage converters. Therefore, advantageously provided is a device consisting of the voltage converters connected in parallel and control logic which enables optimized operation of voltage converters connected in parallel.

In one configuration of the invention, the voltage converters are in the form of DC-DC converters or in the form of inverters. Depending on whether a DC-DC conversion or an inversion is required for the application, the voltage converters are advantageously in the form of DC-DC converters or inverters.

The above configurations and developments can be combined with one another as desired, in so far as is sensible. Further configurations, developments and implementations of the invention also include combinations which have not been explicitly mentioned of features of the invention described above or below in relation to the exemplary embodiments. In particular, a person skilled in the art will in this case also add individual aspects as improvements or additions to the respective basic forms of the invention.

BRIEF DESCRIPTION OF THE DRAWINGS

Further features and advantages of the invention will be explained below with reference to the figures, in which.

DETAILED DESCRIPTION

Figure 1:
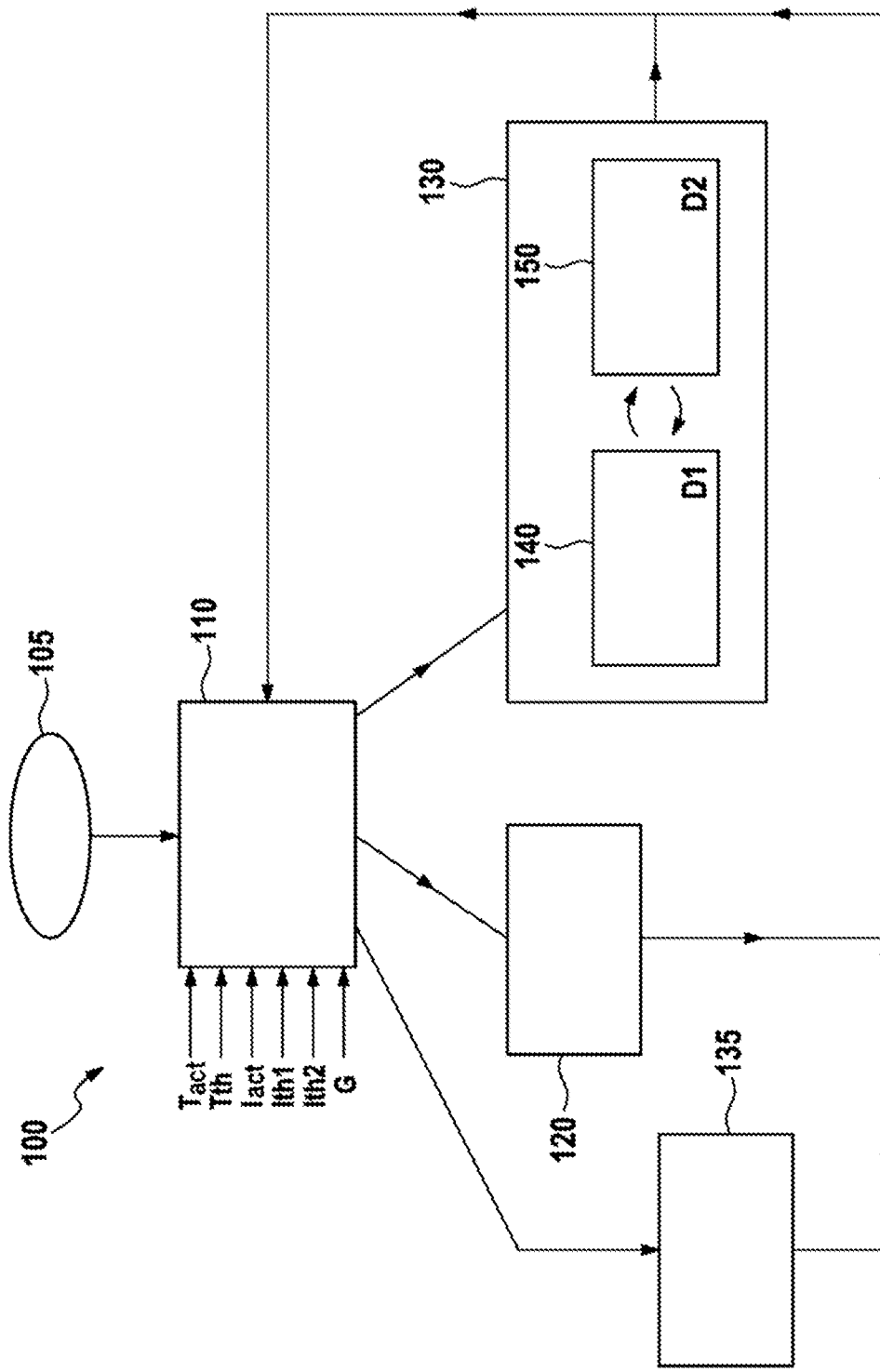
FIG. 1 shows a schematic illustration of a flowchart of a method for operating voltage converters connected in parallel in accordance with one embodiment.

FIG. 1 shows a schematic illustration of a flowchart of a method 100 for operating voltage converters 210, 220, n connected in parallel. The method starts with step 105. In step 110, parameters for the operation of the voltage converters connected in parallel are read in. Thereupon, depending on a determined temperature Tact and/or a determined current Iact and a first temperature limit value Tth and/or a first current limit value Ith1, a decision is made as to the operating mode 120, 130 in which the voltage converters are intended to be operated. The voltage converters 210, 220, n are operated in a first operating mode 120 when the determined temperature Tact is less than the presettable first temperature limit value Tth. The voltage converters 210, 220 are operated in a second operating mode 130 when the determined temperature Tact is greater than the presettable first temperature limit value Tth and/or the determined current is less than the first current limit value Ith1. The operation in the first operating mode 120 comprises operation of, in particular only, a first of the at least two voltage converters 210, 220 and a switched-off state of a second of the at least two voltage converters 210, 220. The operation in the second operating mode 130 comprises two operating phases, wherein a first operating phase 140 comprises the common parallel operation of the at least two voltage converters 210, 220, and a second operating phase 150 comprises the operation of a selected one of the at least two voltage converters 210, 220 and a switched-off state of at least one of the two voltage converters 210, 220. The operation of the selected one of the at least two voltage converters 210, 220 comprises the operation of that voltage converter which was switched off in a first operating mode 120 which has most recently taken place when, directly previously, a transition from the first operating mode 120 to the second operating mode 130 took place or which was switched off in a second operating mode 130 which has most recently taken place in the second operating phase 150 when, directly previously, already an operation in the second operating mode 130 took place. Preferably, the operation of the voltage converters 210, 220 connected in parallel comprises the operation of the voltage converters 210, 220 in a third operating mode 135 when the determined current Iact is greater than a second current limit value Ith2, and the operation in the first or second operating mode 120, 130 when the determined current Iact is less than the second current limit value Ith2, wherein the first current limit value Ith1 is less than the second current limit value Ith2. Preferably, in step 110, a total efficiency G is read in. Preferably, the operation of the voltage converters 210, 220 connected in parallel comprises the operation of the voltage converters 210, 220 in a third operating mode 135 when the total efficiency G in the third operating mode 135 is greater than in the first operating mode 120 and the operation of the voltage converters 210, 220 in the first or second operating mode 120, 130 when the total efficiency G in the third operating mode 135 is less than in the first operating mode 120. Directly after the implementation of the operating modes 120, 130, 135, the method branches off to step 110, in which again the present parameters for the operation of the voltage converters connected in parallel are read in and an operating mode 120, 130, 135 is selected again. Within the second operating mode 130, the two operating phases 140, 150 are implemented successively before the method branches back to step 110. Preferably, operating durations D1, D2 for the operating phases 140, 150 are presettable in order that cooling of a heated voltage converter can take place and limitation of an operated voltage converter can take place whilst avoiding output current fluctuations of the voltage converters connected in parallel.

Figure 2:
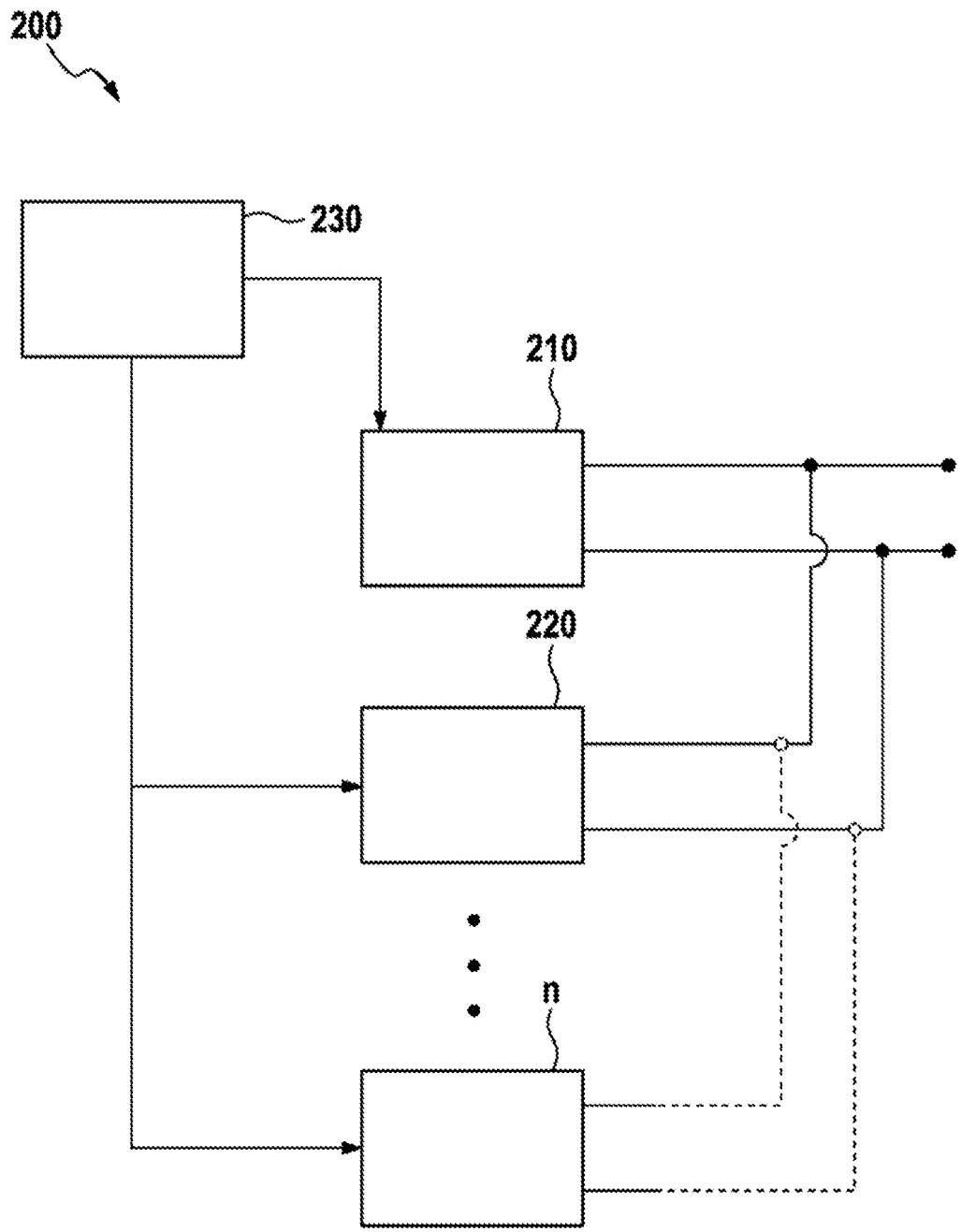
FIG. 2 shows a schematic illustration of a device for operating voltage converters connected in parallel in accordance with one embodiment.

FIG. 2 shows a schematic illustration of a device 200 for operating voltage converters 210, 220, n connected in parallel. The output terminals of the voltage converters 210, 220, n connected in parallel are connected in parallel. The device comprises control logic 230, which is designed to operate the voltage converters 210, 220, n connected in parallel in different operating modes 120, 130, 135 depending on a determined temperature Tact and a presettable first temperature limit value Tth and/or a determined current Iact of the voltage converters 210, 220, n connected in parallel and a presettable first current limit value Ith1 and/or a total efficiency G corresponding to the described method. The voltage converters 210, 220, n are preferably in the form of DC-DC converters or inverters. The device 200 preferably comprises the voltage converters 210, 220, n.

The invention claimed is:

1. A method (100) for operating voltage converters (210, 220) connected in parallel, wherein at least one first and one second voltage converter (210, 220) are connected in parallel on an output side, the method comprising the following steps:
   operating (110) the voltage converters (210, 220) connected in parallel in different operating modes (120, 130) depending on (a) a determined temperature (Tact) and a presettable first temperature limit value (Tth) and depending on (b) a determined current (Iact) and a first presettable current limit value (Ith1),
   operating the voltage converters (210, 220) in a first operating mode (120) when the determined temperature (Tact) is less than the presettable first temperature limit value (Tth),
   operating the voltage converters (210, 220) in a second operating mode (130) when (c) the determined temperature (Tact) is greater than the presettable first temperature limit value (Tth), and (d) the determined current is less than the first presettable current limit value (Ith1),
   wherein the operation of the voltage converters (210, 220) in the first operating mode (120) comprises operation of a first of the at least two voltage converters (210, 220) and comprises a switched-off state of a second of the at least two voltage converters (210, 220),
   wherein the operation of the voltage converters (210, 220) in the second operating mode (130) comprises two operating phases, wherein a first operating phase (140) comprises the common parallel operation of the at least two voltage converters (210, 220), and a second operating phase (150) comprises the operation of a selected one of the at least two voltage converters (210, 220) and a switched-off state of at least one of the two voltage converters (210, 220),
   wherein the operating phases (140, 150) in the second operating mode (130) are performed with in each case presettable first and second operating durations (D1, D2), and
   wherein the first operating duration (D1) of the first operating phase (140) lasts for a shorter period of time than the second operating duration (D2) of the second operating phase (150), and the second operating duration (D2) is longer than one second.

2. A method (100) for operating voltage converters (210, 220) connected in parallel, wherein at least one first and one second voltage converter (210, 220) are connected in parallel on an output side, the method comprising the following steps:
   operating (110) the voltage converters (210, 220) connected in parallel in different operating modes (120, 130) depending on (a) a determined temperature (Tact) and a presettable first temperature limit value (Tth), depending on (b) a determined current (Iact) and a first presettable current limit value (Ith1), or depending on both (a) and (b),
   operating the voltage converters (210, 220) in a first operating mode (120) when the determined temperature (Tact) is less than the presettable first temperature limit value (Tth),
   operating the voltage converters (210, 220) in a second operating mode (130) when (c) the determined temperature (Tact) is greater than the presettable first temperature limit value (Tth), (d) the determined current is less than the first presettable current limit value (Ith1), or both (c) and (d),
   operating (110) the voltage converters (210, 220) connected in parallel in different operating modes (120, 130, 135) depending on the total efficiency (G) of the voltage converters (210, 220) connected in parallel,
   operating the voltage converters (210, 220) in a third operating mode (135) when the total efficiency (G) in the third operating mode (135) is greater than in the first operating mode (120), and
   operating the voltage converters (210, 220) in the first or second operating mode (120, 130) when the total efficiency (G) in the third operating mode (135) is less than in the first operating mode (120), wherein the operation of the voltage converters (210, 220) in the first operating mode (120) comprises operation of a first of the at least two voltage converters (210, 220) and comprises a switched-off state of a second of the at least two voltage converters (210, 220), wherein the operation of the voltage converters (210, 220) in the second operating mode (130) comprises two operating phases, wherein a first operating phase (140) comprises the common parallel operation of the at least two voltage converters (210, 220), and a second operating phase (150) comprises the operation of a selected one of the at least two voltage converters (210, 220) and a switched-off state of at least one of the two voltage converters (210, 220).

\* \* \* \* \*